Figure 1:
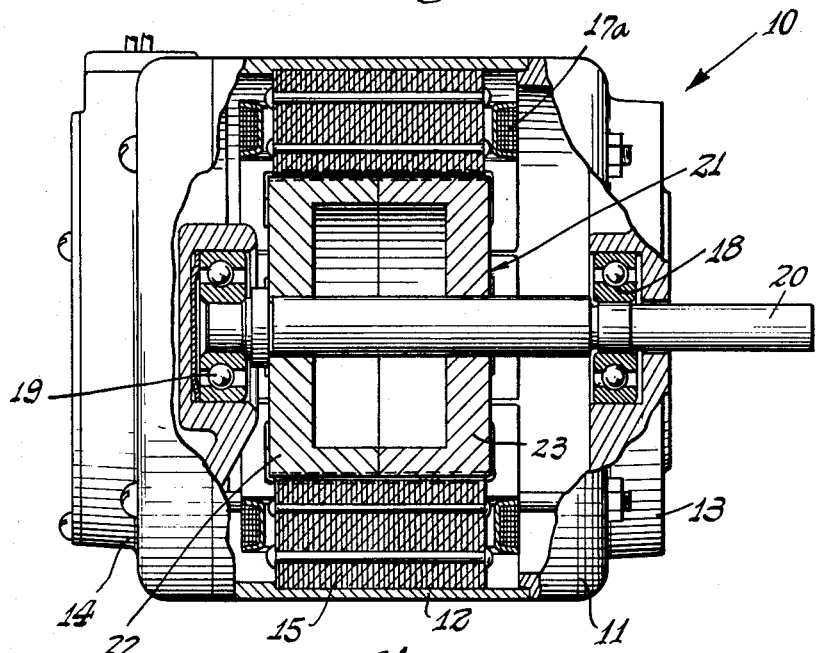

Sept. 8, 1964    G. O. FREDRICKSON    3,148,319
ELECTRIC MOTOR

Filed June 29, 1961    3 Sheets-Sheet 1

INVENTOR.
Gustav O. Fredrickson
BY
Johnson and Kline
ATTORNEYS

Sept. 8, 1964  G. O. FREDRICKSON  3,148,319
ELECTRIC MOTOR
Filed June 29, 1961  3 Sheets-Sheet 2

INVENTOR.
Gustav O. Fredrickson
BY
Johnson and Kline
ATTORNEYS

Sept. 8, 1964    G. O. FREDRICKSON    3,148,319
ELECTRIC MOTOR
Filed June 29, 1961    3 Sheets-Sheet 3

INVENTOR.
Gustav O. Fredrickson
BY
Johnson and Kline
ATTORNEYS

United States Patent Office 3,148,319
Patented Sept. 8, 1964

3,148,319
ELECTRIC MOTOR
Gustav O. Fredrickson, Southington, Conn., assignor to The Superior Electric Company, Bristol, Conn., a corporation of Connecticut
Filed June 29, 1961, Ser. No. 120,581
3 Claims. (Cl. 318—166)

The present invention relates to an electric motor of the synchronous inductor type and more particularly to such a motor that may be incrementally rotatively advanced in either direction.

The motor of the present invention is similar to the type of motor disclosed in U.S. Patent No. 2,982,872 granted on May 2, 1961 to G. O. Fredrickson. Such a motor has a stator formed to provide a plurality of radially inwardly extending poles which are magnetized by proper energization of windings associated with the poles. The rotor includes end caps that in the heretofore known motor are permanently magnetized by a permanent magnet constituting part of the rotor with one end cap being of one polarity and the other end cap being of the other polarity.

While such a motor has been found satisfactory in many installations when attempts have been made to control the movement of the motor by rapid switching apparatus, such as electronic circuitry, difficulties have been encountered by the motor not being able to rapidly respond to the change of the energization thereto. This may be generally traceable to the construction of the rotor in which the employment of a permanent magnet of the necessary size to produce the required magnetization of the end caps increases the inertia of the rotor and hence limits the response and thus the speed to which the rotor may be incrementally rotated without losing an increment.

It is accordingly an object of the present invention to provide a synchronous inductor motor of the above described constructional type which has a faster speed of response and thus may be incrementally advanced at a higher rate than heretofore possible without the loss of an incremental energizational step.

Another object of the present invention is to provide an electric motor which provides an output torque commensurate to a motor having a rotor that includes a permanent magnet as the rotor above-mentioned but yet in which the weight and inertia of the rotor is substantially decreased.

A further object of the present invention is to provide a motor which achieves the above objects and yet is economical to manufacture, reliable in operation and may be electrically energized to be maintained stationary in a braked position.

In carrying out the present invention, there is provided a motor frame on which is mounted a stator with a rotor rotatably mounted by the ends of the casing to be circumscribed by the stator. The stator is essentially ring shaped and formed of laminations of paramagnetic material with radially inwardly directed poles that have their radially innermost ends arcuate and formed to provide teeth. The rotor includes at least one end cap or disk of paramagnetic material, such as sintered iron, whose periphery is also formed with a plurality of teeth. The teeth of the rotor are juxtapositioned to the teeth of the poles and spaced slightly therefrom to provide for freedom of movement of the rotor with respect to the stator.

The poles of the stator each have an inductive winding of electrical wire positioned thereabout for magnetizing their respective pole upon energization thereof and according to the specific embodiment of the present invention hereinafter set forth there are eight stator poles equally spaced about the periphery of the rotor. Each of the stator poles is provided with its own winding for magnetizing its own pole and according to the present invention, diametrically opposite windings are electrically interconnected in a manner such that upon energization of these two windings, one will produce a pole of one magnetic polarity and the other a pole of the opposite magnetic polarity. Moreover, according to the present invention, each set of diametrically opposing poles is only energized by current flowing in one direction and hence will at all times, whenever energized, have the same polarity. Each of the sets of windings is capable of being independently energized with respect to the other sets but yet may be interconnected to enable alternate energization in the direction of movement in which it is desired to rotate the rotor, with the rotor in effect following the magnetized poles. In one embodiment of the invention wherein the motor is energized by direct current this is effected by use of switching means that may either energize one set or two sets at a time, while in another embodiment of the invention wherein energization is from a two phase, alternating current source, such as 60 cycle, the windings are interconnected into two groups with each group consisting of two sets.

The motor in the above-noted U.S. patent, by reason of the end caps being permanently magnetized, provides for a braking and holding of the movement of the rotor whenever there is no energization of the stator windings. While this is not so with respect to the motor of the present invention as the rotor is in effect free moving when the stator windings are not energized, there is provided however circuitry which effects energization of the stator windings to provide for braking of the rotor and maintaining it in the selected position.

Other features and advantages will hereinafter appear.

Figure 2:
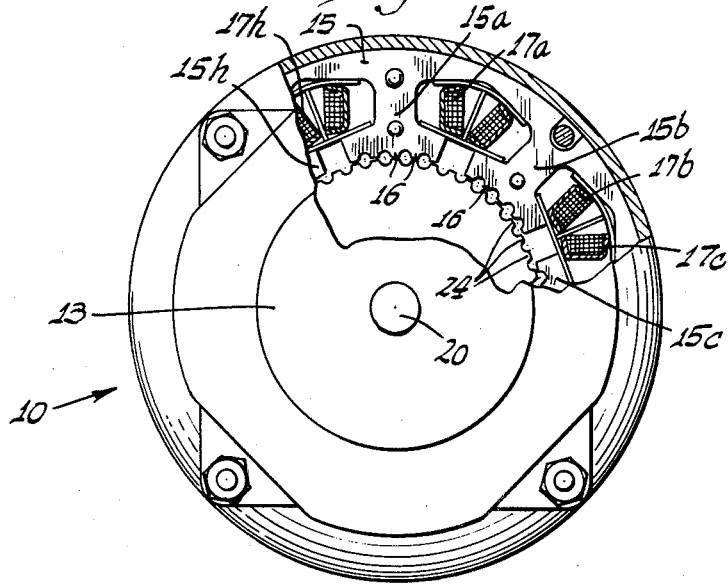
Figure 3:
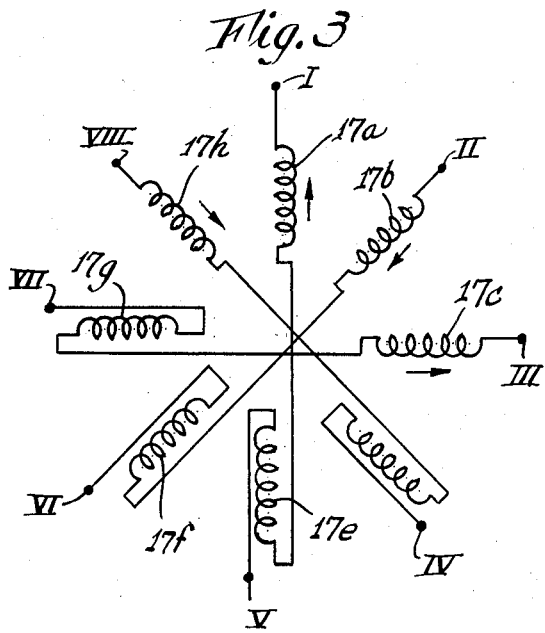
Figure 4:
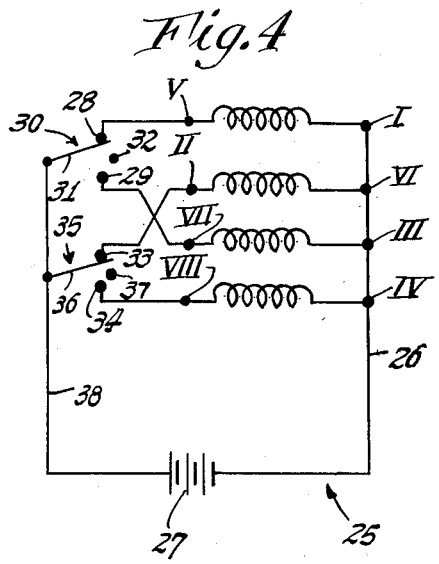
Figure 5:
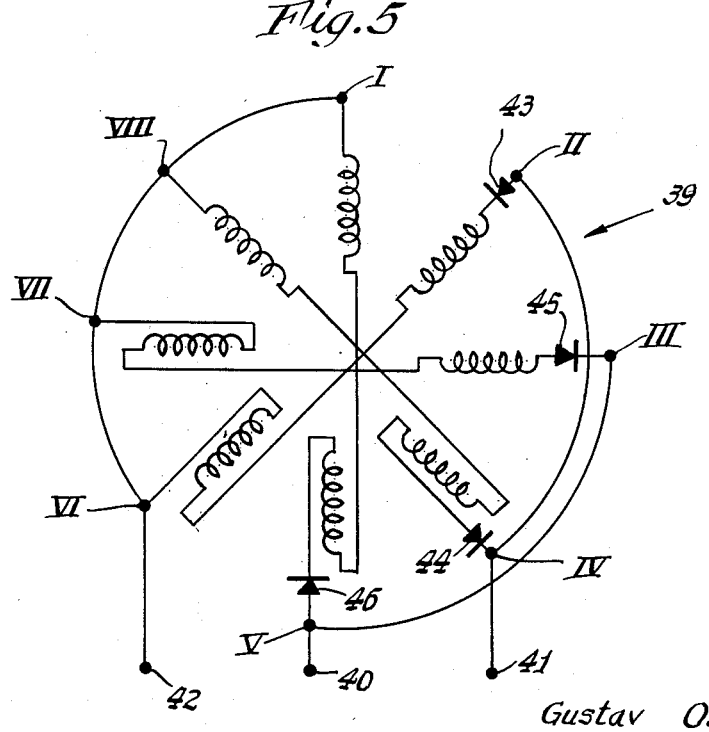
Figure 6:
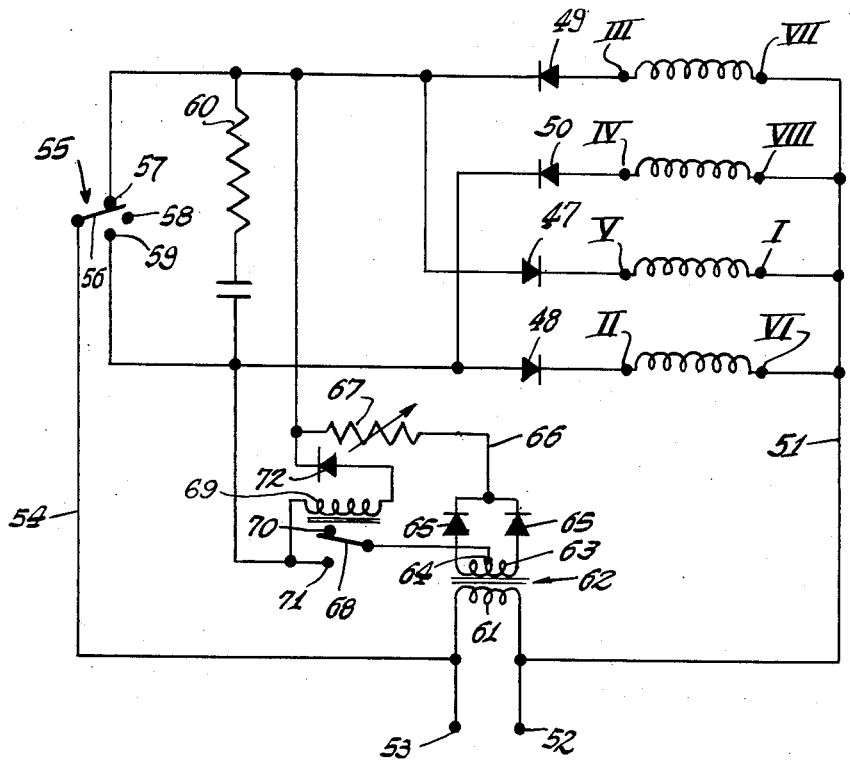

In the drawing:
FIGURE 1 is an elevation, partially in axial cross-section of the motor of the present invention.
FIG. 2 is an end view of the motor, partially in section.
FIG. 3 is a pictorial representation of the position of the windings of the stator poles.
FIG. 4 is an electrical schematical diagram of a circuit for incremental advancing of the motor using a unidirectional current source.
FIG. 5 is an electrical schematical diagram of the motor of the present invention when energized by two phase, alternating current.
FIG. 6 is an electrical schematical diagram of a circuit for energization of the motor with alternating current for effecting both rotational movement and stationary holding of the rotor.

Referring to the drawing, the motor of the present invention is generally indicated by the reference numeral 10 and includes a frame or casing 11 formed of a cylindrical tubular section 12 and front end bell 13 and rear end bell 14 that are secured together. An annular stator 15, formed of laminated pieces of paramagnetic material is secured, as by a force fit, to the inner surface of the tubular section 12. The stator 15 is formed to have inwardly directed radially extending poles (specifically eight in the embodiment shown herein) 15a through 15h respectively, with the poles 15a and 15b being shown fully, poles 15c and 15h partially and the others not shown. The poles are equally positioned about the stator and have the same size and shape with the inner surface of each pole being formed to have the same number of teeth 16. A winding formed of a coil of conducting wire inductively encircles each of the poles and each winding is indicated by the reference character 17a through 17h respectively, with the letter of the pole reference character having a winding that has the same letter in its reference character.

The end bells 13 and 14 support ball bearings 18 and 19 respectively to provide for rotatably mounting a shaft 20 of a rotor generally indicated by the reference numeral 21. The rotor, as shown, includes a pair of annular disks 22 and 23 having substantial axial width at their periphery that are axially secured on the shaft 20, the disks being preferably formed of sintered iron though if desired may be formed of laminated sheets of paramagnetic material. The periphery of the disks is formed to provide teeth 24 that, on both the stator poles and the rotor disks, are equally spaced. However, as in the above-mentioned patent, the number of teeth in the stator is such as to cause the pitch of the stator teeth to be slightly different from the pitch of the rotor teeth.

As shown in FIG. 3, the winding 17a is connected to the winding 17e such that unidirectional current flowing therethrough in the direction of the arrow renders the pole 15a north and the pole 15e south. Similarly the windings 17b and 17f, 17c and 17g and 17h are connected with the winding sets terminating in the terminals I through VIII respectively.

Shown in FIG. 4, is an electric circuit indicated by the reference numeral 25 employing direct current to provide for energization of the windings and hence movement of the rotor. Thus, in this figure the terminal numbers of FIG. 3 are employed to indicate the interconnection of the winding sets and thus there are terminals I, VI, III and IV connected to a lead 26 to the negative side of a battery 27 which provides unidirectional electrical energy. The terminal ends V and VII are connected to terminals 28 and 29 of a switch 30, having a switch arm 31 and an open terminal 32 while the terminals II and VIII are connected to terminals 33 and 34 of a switch 35 having a switch arm 36 and an open terminal 37. The switch arms 31 and 36 are connected by a lead 38 to the positive side of the battery 27.

The switch arms are thrown (or electric circuitry may be employed if desired) to energize (or not energize) the terminals and their connected winding sets in the following sequence 28 and 37, 28 and 33, 33 and 32, 33 and 29, 29 and 37, 29 and 34, 34 and 32, 34 and 28, 28 and 37, etc., thus producing a movement of the rotor one tooth pitch. If instead of employing an eight step switching sequence to move the rotor one tooth pitch, a four step sequence may be obtained by the elimination of the open contacts 32 and 37 and thus move the switches to energize the terminals in the following sequence 28 and 33, 29 and 33, 29 and 34, 29 and 33, 28 and 33, etc. While the above sequences rotate the rotor in one direction, a reversal of the sequence will rotate the rotor in the other direction. Moreover, the maintenance of the energization of a step by not moving the switch arms will hold the rotor stationary in a braked position.

It will thus be clear that each of the poles when energized has the same polarity and that alternate poles have the same polarity with intermediate poles having the opposite polarity.

Referring to FIG. 5, there is shown an electrical schematical diagram of a circuit 39 which connects the windings to be energized from a two phase source of alternating current with the phases being 90 electrical degrees apart and applied to the terminals 40 and 41 with the terminal 42 being common. The common terminal 42 is connected to the terminals I, VI, VII and VIII while the terminal 41 is connected to the terminals II and IV. A one-way valve 43 at the terminal II limits current flowing thereto to only unidirectional current from the terminal 41 to the terminal 42 while another one-way valve 44 provides for only unidirectional current to flow from the terminal 42 to the terminal 41. Similarly the terminal 40 is connected to the terminals III and V through oppositely directed one-way valve means 45 and 46 respectively to provide for the unidirectional flow of current through these respective winding sets. It will thus be seen that this structure functions in the same manner as that described in FIG. 4 in that changing of the polarity of the alternating current performs the functioning of the switches and hence provides for the rotor being advanced in increments of 1/8 of a tooth pitch for each change of direction of the current in each of the two phases. The direction of rotation may be changed by altering the phase relationship of the two phases.

While the circuit shown in FIG. 5 produces rotational movement upon energization of the stator windings, upon deenergization thereof there is no magnetization of the stator to hold the rotor and hence the rotor in effect is free to move. To provide for holding the rotor in a braked, stationary position when the motor is energized from an alternating current source, a circuit schematically shown in FIG. 6 may be employed. Referring to this figure, the terminals of the winding sets have been given the same Roman numerals as in the other figures and thus winding set terminals I and V include one-way valve means 47, winding set terminals II and VI oneway valve 48 and oneway valves 49 and 50 for the other winding set terminals III and VII and IV and VIII respectively. The terminals I, VI, VII and VIII are connected by a lead 51 to one terminal 52 of a source of alternating current. The other terminal, indicated by reference numeral 53, is connected by a lead 54 to a switch 55 having a switch arm 56 movable into engagement with either of the contacts 57, 58 and 59. Contact 57 is connected to the one-way valve means 47 and 49, it being appreciated that these are connected to be conductive in opposite directions while contact 59 is connected to oneway valve means 48 and 50 which are also connected to be conductive in opposite directions. A phase shifting network 60 including a capacitor and a resistor is interconnected between the two terminals 57 and 59. Accordingly operation of the switch arm 56 into engagement with the contact 57 causes rotation of the rotor in one direction while shifting the switch arm into engagement with the contact 59 will effect rotation of the rotor in the other direction. It will thus be seen that this circuit is essentially that shown in FIG. 5 in which the phase shifting network is employed to in effect change the single phase input to two phase.

Terminals 52 and 53 additionally are connected to a primary winding 61 of a transformer 62 having a secondary winding 63 that is center tapped as at 64. The winding 63 through one-way valve means 65 is connected to a lead 66 which through an adjustable resistance 67 connects to a lead connected to the contact 57. The center tap 64 is connected to a switch arm 68 of a relay 69 having contacts 70 and 71 with the switch arm 68 normally being in engagement with the contact 71 which in turn is connected to the contact 59. The coil of the relay 69 is connected between the lead 66 and the terminal 71 with the connection including a one-way valve 72 conductive in the direction shown.

In the operation of this circuit with the switch arm 56 engaging the contact 57, the motor will rotate in one direction while with the switch arm 56 engaging the contact 59, the motor will rotate in the opposite direction. In both of these conditions, the relay 69 is energized to maintain the switch arm 68 in engagement with the open contact 70 by means of half-wave D.C. flowing from either of the contacts 59 and 57 through the relay coil and the one-way valve means 72.

Upon movement of the switch arm 56 to the terminal 58 to stop the motor, direct current flows through the lead 66, resistor 67, one-way valve 47, the terminals V and I, the terminals VIII and IV and one-way valve 50, the switch contact 71, the switch arm 68 (since the relay 69 is deenergized) to the center tap 64. Thus a continuous unidirectional energization of the above-noted two winding sets is achieved which is sufficient to maintain the rotor braked in the desired position. This desired position is determined by the position of the rotor when switch arm 56 is moved into engagement with the contact 58. Moreover, it will be clear that when the motor is being energized by direct current as when braked, the one-way valve 72 prevents direct current from energizing the relay 69.

It will accordingly be appreciated that there has been disclosed a synchronous inductor motor, and circuits therefor, which by proper energization may be rotated in either direction or which may be maintained stationary in a braked position. The motor is capable of responding faster to changes in energization without loss of a change than in motors of the type similarly known by reason of the decrease in the mass of the rotor. This is effected by the elimination of a permanent magnet which has heretofore been employed in such a motor and yet the motor of the present invention retains substantially the same characteristics as if it had such a magnet.

Variations and modifications may be made within the scope of the claims and portions of the improvements may be used without others.

I claim:

1. A motor of the synchronous inductor type comprising a frame, an annular stator mounted on the frame and having a plurality of equally spaced, radially inwardly extending poles, the inner periphery of the poles being formed with equally spaced teeth, a winding inductively associated with each pole, means connecting the windings of diametrically opposite poles in series to form independently energizable winding sets with energization of each winding set producing a polarity of magnetization of one pole opposite to that of the other, there being at least four poles forming two winding sets, a rotor rotatably mounted on the frame and axially extending through the stator, said rotor including a substantially cylindrical portion positioned to be radially aligned with the poles and having a periphery formed with equally spaced teeth closely juxtaposed to the teeth of the poles, said rotor being free of permanent magnetism, means connectible to a source of alternating current and to the winding sets for energizing one winding set with inphase alternating current and energizing the other winding set with out-of-phase alternating current, and including means limiting the current through one winding set to only a unidirectional current which is opposite to the unidirectional current through the other winding set to cause rotation of the rotor and means upon cessation of energization of the winding sets by the alternating current for supplying a unidirectional current to the winding sets to maintain them energized to maintain the rotor stationary.

2. The invention as defined in claim 1 in which the means connectible to a source of alternating current includes a phase shifting network and means for shifting the energization of the one winding set to out-of-phase alternating current and the other winding set to inphase alternating current to thereby reverse the direction of rotation of the rotor.

3. The invention as defined in claim 1 in which there are four winding sets, two being connected as a pair to be energized by inphase alternating current and the other two being connected as a pair to be energized by out-of-phase alternating current, in which the means for limiting the current in the winding sets to unidirectional causes the flow of unidirectional current in each of the two winding sets of each pair to being opposite and in which the means for supplying unidirectional current to maintain the rotor stationary maintains only one winding set of each pair energized.

References Cited in the file of this patent

UNITED STATES PATENTS

| | | |
|---|---|---|
| 2,249,029 | Mullerheim | July 15, 1941 |
| 3,001,093 | Wilcox et al. | Sept. 19, 1961 |